A. R. LELAND, R. B. BENJAMIN & G. A. SELLAR.
TOY MOLD.
APPLICATION FILED JAN. 8, 1916.
1,287,599.
Patented Dec. 10, 1918.
3 SHEETS—SHEET 1.
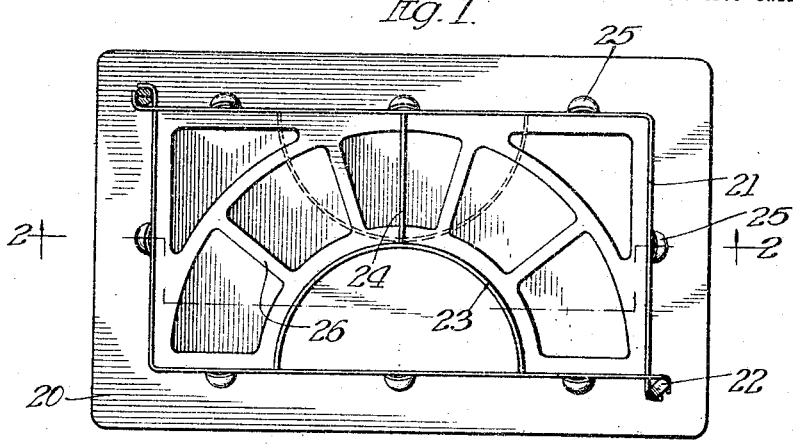
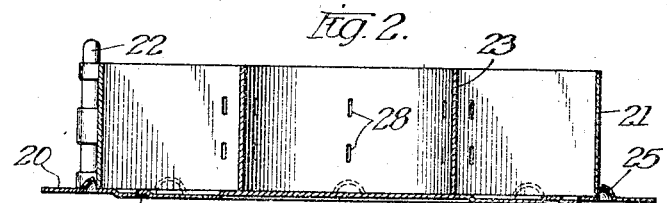
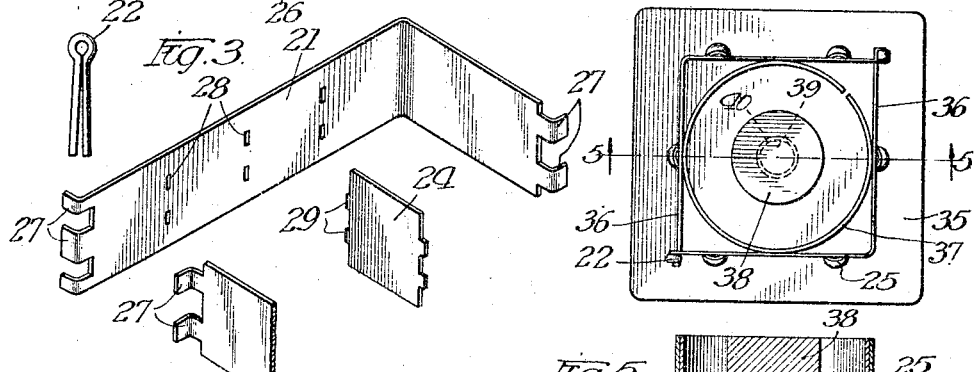
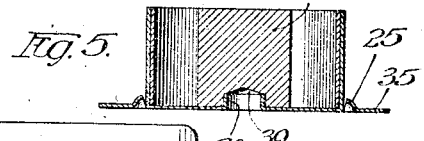
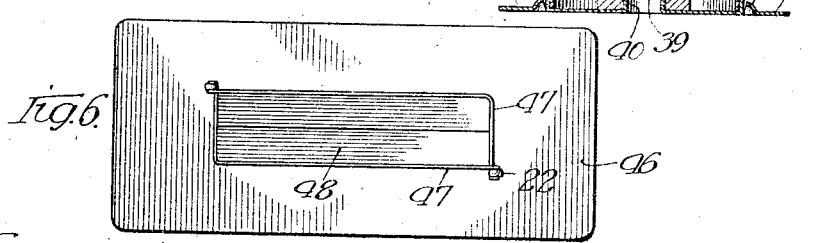

A. R. LELAND, R. B. BENJAMIN & G. A. SELLAR.
TOY MOLD.
APPLICATION FILED JAN. 8, 1916.
1,287,599.  Patented Dec. 10, 1918.
3 SHEETS—SHEET 2.
Fig. 7.
91
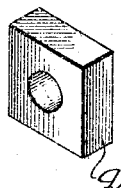
Fig. 8.
92
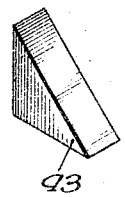
Fig. 9.
93
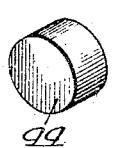
Fig. 10.
44
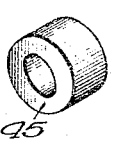
Fig. 11.
45
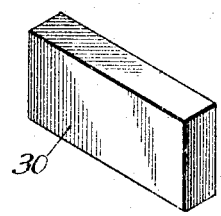
Fig. 12.
30
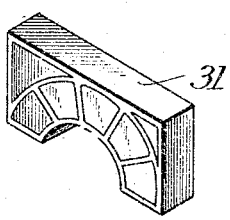
Fig. 13.
31
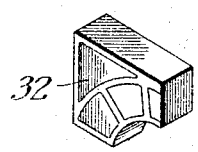
Fig. 14.
32
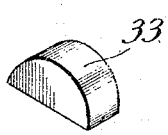
Fig. 15.
33
Fig. 16.
34
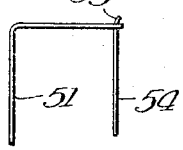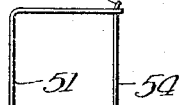
Fig. 19.
53
51  54
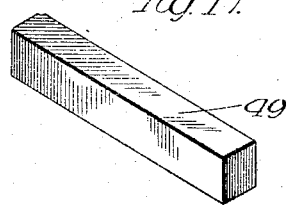
Fig. 17.
49
Fig. 20.
52
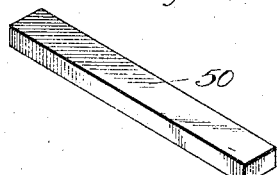
Fig. 18.
50
Witnesses:
Robert F. Weir
Inventor
Albert R. Leland
Reuben B. Benjamin
George A. Sellar
Jones, Addington, Ames & Seibold Attys.

A. R. LELAND, R. B. BENJAMIN & G. A. SELLAR.
TOY MOLD.
APPLICATION FILED JAN. 8, 1916.
1,287,599.
Patented Dec. 10, 1918.
3 SHEETS—SHEET 3.
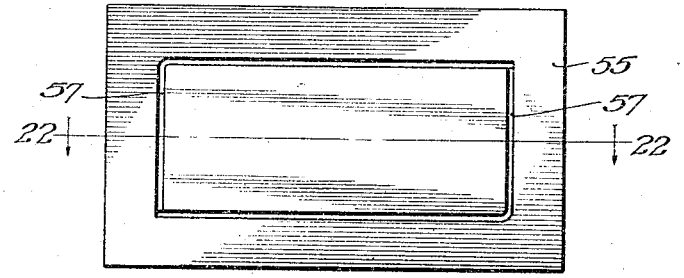
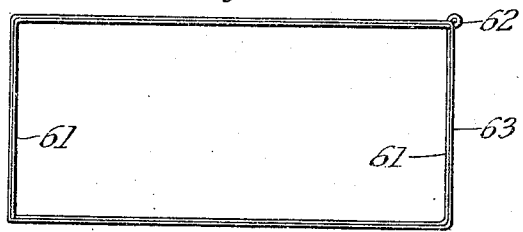
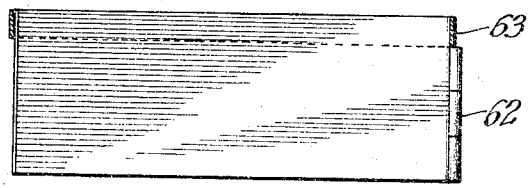
Witnesses:
Robert H. Weir
Inventors
Albert R. Leland
Reuben B. Benjamin
George A. Sellar
Jones, Addington, Ames & Seibold Attys.

UNITED STATES PATENT OFFICE.

ALBERT R. LELAND, REUBEN B. BENJAMIN, AND GEORGE A. SELLAR, OF CHICAGO, ILLINOIS, ASSIGNORS TO BENJAMIN-SELLAR MANUFACTURING COMPANY, OF CHICAGO, ILLINOIS, A CORPORATION OF ILLINOIS.

TOY MOLD.

1,287,599.  Specification of Letters Patent.  Patented Dec. 10, 1918.

Application filed January 8, 1916. Serial No. 70,994.

*To all whom it may concern:*

Be it known that we, ALBERT R. LELAND, REUBEN B. BENJAMIN and GEORGE A. SELLAR, all citizens of the United States, residing at Chicago, in the county of Cook and State of Illinois, have jointly invented certain new and useful Toy Molds, of which the following is a full, clear, concise, and exact description, reference being had to the accompanying drawings, forming a part of this specification.

Our invention relates to toy molds for building blocks, that is, to molds which are to be sold as toys to be used by children in making toy building blocks so that the children themselves can make the desired number of the various shaped blocks.

One of the objects of our invention is to provide such molds which will be simple in construction, convenient to use, durable and cheap to manufacture, and in which a great variety of shapes may be made with a small amount of apparatus.

Further objects will appear from the detailed description to follow taken in connection with the appended claims.

In the drawings in which we have shown several embodiments of our invention;

Figure 1 is a plan view of a mold for making the blocks shown in Figs. 12 to 16, inclusive;

Fig. 2 is a section on the line 2—2 of Fig. 1;

Fig. 3 is a perspective view of parts of the mold of Fig. 1 disassembled;

Fig. 4 is a plan view of a mold used for making the blocks shown in Figs. 7 to 11 inclusive;

Fig. 5 is a section on the line 5—5 of Fig. 4;

Fig. 6 is a plan view of a mold for making the blocks shown in Figs. 17 and 18;

Figs. 7 to 18 inclusive, are perspective views of various forms of blocks which can be made in the molds shown in Figs. 1 to 6, inclusive; and Fig. 19 is a plan view of part of a mold showing a modified form of connection between the side wall members;

Fig. 20 is an elevation of part of one of the side wall members of Fig. 19.

Fig. 21 is a plan view of a modified form of mold.

Fig. 22 is a section on the line 22—22 of Fig. 21;

Figs. 23 and 24 are vertical longitudinal sections of modified forms of bases; Fig. 25 is a plan view of a modified form of side wall construction;

Fig. 26 is a side elevation of Fig. 25.

Referring to the drawings in detail, and first to Figs. 1, 2 and 3, the mold here shown comprises a rectangular bottom plate 20 which may be of sheet metal, two similar bent side wall members 21 which also may be of sheet metal, the lower edges of which rest on the bottom plate, split pins 22 for holding the side wall members 21 together, a semi-circular partition 23 detachably engaging one of the side walls, and a straight partition 24 detachably engaging one of the side walls, and the semi-circular partition. The bottom plate 20 is provided with projections or lugs 25 integral therewith and struck up therefrom for positioning the side wall members 21 and also for preventing spreading of the latter when the material within the molds is tamped. As shown in Fig. 2 these projections 25 are formed so that they have a cut edge which extends alongside of said wall members, and that this cut edge slopes upwardly and away from the side walls so as to guide said walls into position when the parts are being assembled. The bottom plate may be embossed, as shown at 26, to give an ornamental appearance to the blocks as shown in Figs. 13 and 14. The adjacent ends of the side wall portions are provided with interengaging bent open fingers 27 between which the split pins 22 are inserted to hold the side wall members together. As shown in Fig. 3 the tension in the split pin 22 is such as to normally hold the two portions of the pin separated, which causes them to exert a pressure tending to hold the side-wall members 21 firmly in engagement with each other when the pin is inserted. The side wall members and the semi-circular parts 23 are provided with slots 28 to receive projections or tongues 29 for holding the various parts in their proper position. In using this mold, if it is desired to make the block 30 shown in Fig. 12, the partitions 23 and 24 are removed, and if it is desired to make the block 31 shown in Fig. 13, the partition 24 only is removed. For the blocks shown in Figs. 14 and 15 both of the partitions are left in place, and for the block 34 shown in Fig. 16 the partition 24 is shifted to the opposite side of the partition 23. Suitable tools may be provided for tamping and striking off the material used for forming the blocks, which material may be cement or other moldable material.

The mold shown in Figs. 4 and 5 comprises a bottom plate 35 and side wall members 36 which are substantially similar to the bottom plate and side wall members shown in Fig. 1, which side wall members are connected by split pins 22 as in the mold of Fig. 1. A split circular partition 37 fits snugly and removably within the side walls 36 and a core 38 may be centrally located within the mold. This core 38 is provided with an axial recess 39, the walls of which engage a struck-up annular flange or projection 40 formed integral with the bottom plate 35. In using this mold to form the block 41 shown in Fig. 7 the core 38 and circular partition 37 are both removed. To form the block 42, Fig. 8, the circular partition alone is removed. To form the block 43, Fig. 9, a diagonal partition is provided. To form the cylinder 44 of Fig. 10 the core 38 alone is removed, and to form the hollow cylinder 45 of Fig. 11 both core and circular partition are left in place. In this modification, as in Fig. 1, the bottom plate, side wall members and partition may be formed of sheet material.

It will be noted that the molds are so constructed that the walls may be moved directly away from the adjacent material. Thus by removing one of the corner pins 22 the mold may be opened about the other corner pin 22 as a hinge. Also the tension in the split circular partition 37 is such that it has to be sprung slightly when inserted within the side wall members 36 so that when the side wall members are removed the circular partition will spring away from the material inside of it so that it can be easily removed without disturbing the molded material.

It will be noted also that the two side wall members 21 which form the inclosure are exact duplicates and can be made from the same die.

In the modification of Fig. 6 the bottom plate 46 and side wall members 47 are substantially similar to the bottom plates and side wall members of the forms just described and the side wall members are connected by means of split pins 22. In this form the lugs 25 may be omitted. In this form a filler block 48, which may be of wood, is provided whereby either wide blocks 49, Fig. 17, or narrow blocks 50, Fig. 18, may be formed.

In the modification of Figs. 19 and 20 one of the side wall members 51 is provided with openings or slots 52 to receive curved fingers 53 on the other side wall member 54. The other connection between the side wall members 51 and 54 may be the same as that shown in Figs. 1 to 6 inclusive. In using this modification the pin may be removed from one corner of the inclosure and the side wall members 51 and 54 opened about the other connection as a hinge. In this modification, however, the two side wall members 51 and 54 are not duplicates.

In Figs. 21 and 22 a modification is shown in which a base 55 which may be of cast metal is provided with a deep, narrow rectangular groove 56 to receive the two L-shaped side members 57, which latter may be of sheet metal. In this construction the groove 56 is deep enough to hold the side members 57 in position and to prevent their spreading.

In Fig. 23 a modification of the base which receives the side members is shown, comprising a dished or trough member 58 which may be of formed sheet metal, and which is dished deeply enough to receive the side wall members 57 and prevent their spreading.

In Fig. 24 a still further modification is shown in which the dished base 59 which may be of formed sheet metal is provided with a narrow rectangular groove or channel 60 to receive the lower edges of the side wall members.

In Figs. 25 and 26 a modification of the side wall construction is shown comprising two L-shaped members 61 which may be of formed sheet metal hinged together as at 62, and provided with a rectangular retaining band 63 at the upper edge to hold the members 61 together, and prevent their spreading. This retaining band 63 may be rested on the hinge 62, whereby it will be held in position and prevented from slipping down.

Having thus described our invention what we claim as new and desire to secure by Letters Patent is:—

1. In a toy mold for toy building blocks, a sheet metal bottom plate, removable side walls supported by said bottom plate and forming an inclosure, said bottom plate having positioning lugs integral therewith and struck up therefrom engaging the lower edge of said side walls, said lugs each having a cut edge portion extending alongside said walls and engaging them.

2. In a toy mold for toy building blocks, a sheet metal bottom plate, removable side walls supported by said bottom plate and forming an inclosure, said bottom plate having positioning lugs integral therewith and struck up therefrom engaging the lower edge of said side walls, said lugs each having a cut edge portion extending alongside said walls and engaging them, said cut edge portions inclined upwardly and away from said side walls.

3. In a toy mold for toy building blocks, a bottom plate, an inclosure comprising a side wall removably supported on said bottom plate and provided with a bent open finger extending from one end thereof, a second side wall also removably supported on said bottom plate and having an end adjacent said end of said first wall and provided with a bent open finger extending from said end, and means for holding said side walls together comprising a pin embraced by said fingers.

4. In a toy mold for toy building blocks, a bottom plate, an inclosure comprising a side wall removably supported on said bottom plate and provided with a bent open finger extending from one end thereof, a second side wall also removably supported on said bottom plate and having an end adjacent said end of said first wall and provided with a bent open finger extending from said end, and means for holding said side walls together comprising a split pin embraced by said fingers, the tension in said split pin being such as to normally hold the split portions of the pin separated to draw the side walls snugly together when the pin is inserted.

5. In a toy mold for toy building blocks, a bottom plate, an inclosure comprising a side wall removably supported on said bottom plate and provided with a bent open finger extending from one end thereof, a second side wall also removably supported on said bottom plate and having an end adjacent said end of said first wall and provided with a bent open finger extending from said end, and means for holding said side walls together comprising a pin embraced by said fingers, said side walls being formed of sheet metal and said fingers being formed integral therewith.

6. In a toy mold for toy building blocks, a bottom plate, an inclosure comprising a side wall removably supported on said bottom plate and provided with a plurality of bent open fingers extending from one end thereof, a second side wall also removably supported on said bottom plate and having an end adjacent said end of said first wall and provided with a plurality of bent open fingers extending from said end, and means for holding said side walls together comprising a pin embraced by said fingers, said side walls being formed of sheet metal and said fingers being formed integral therewith.

7. In a toy mold for toy building blocks, a sheet metal bottom plate, removable side walls supported by said bottom plate and forming an inclosure, a core member located within said inclosure and supported on said bottom plate, said bottom plate having a projection struck up therefrom and said member having a recess the walls of which engage said projection.

8. In a toy mold for toy building blocks, a sheet metal bottom plate, removable side walls supported by said bottom plate and forming an inclosure, a core member located within said inclosure and supported on said bottom plate, said bottom plate having an annular projection struck up therefrom and said member having a recess the walls of which engage said annular projection.

9. In a toy mold for toy building blocks, a bottom plate, a side wall removably supported on said bottom plate and provided with a bent open finger extending from one end thereof, a second side wall also removably supported on said bottom plate and having an end adjacent said end of said first wall and provided with a bent open finger extending from said end, and means for holding said side walls together comprising a pin embraced by said fingers, said bent fingers lying outside the inclosure between said side walls.

10. In a toy mold for toy building blocks, a base, side walls supported by said base and forming an inclosure, and a split spring ring partition held in a contracted state in engagement with said side walls.

In witness whereof, we have hereunto subscribed our names.

ALBERT R. LELAND.
REUBEN B. BENJAMIN.
GEORGE A. SELLAR.

Copies of this patent may be obtained for five cents each, by addressing the "Commissioner of Patents, Washington, D. C."